US010171887B2

(12) United States Patent
Radloff (10) Patent No.: US 10,171,887 B2
(45) Date of Patent: Jan. 1, 2019

(54) METHODS AND SYSTEMS FOR INTELLIGENT PLAYBACK (71) Applicant: Comcast Cable Communications, LLC, Philadelphia, PA (US)

(72) Inventor: Jon Radloff, Castle Rock, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 153 days.

(21) Appl. No.: 13/800,531

(22) Filed: Mar. 13, 2013

(65) Prior Publication Data
US 2014/0267899 A1 Sep. 18, 2014

(51) Int. Cl.
*H04N 21/845* (2011.01)
*H04L 29/06* (2006.01)
*H04N 21/239* (2011.01)
*H04N 21/24* (2011.01)
*H04N 21/433* (2011.01)
*H04N 21/44* (2011.01)
*H04N 21/442* (2011.01)
*H04N 21/6373* (2011.01)

(52) U.S. Cl.
CPC ..... *H04N 21/8456* (2013.01); *H04L 65/1083* (2013.01); *H04L 65/604* (2013.01); *H04L 65/80* (2013.01); *H04N 21/2393* (2013.01); *H04N 21/2401* (2013.01); *H04N 21/2402* (2013.01); *H04N 21/4331* (2013.01); *H04N 21/44004* (2013.01); *H04N 21/4424* (2013.01); *H04N 21/44209* (2013.01); *H04N 21/6373* (2013.01)

(58) Field of Classification Search
CPC .... H04N 7/17309; H04N 7/26; H04N 19/146; H04N 21/44209; H04N 21/262; H04N 21/8456; H04N 21/2393; H04N 21/2401; H04N 21/4331; H04N 21/44004; H04N 21/4424; H04N 21/6373; H04N 21/47217; H04N 21/23406; H04N 21/47202; H04L 65/60; H04L 12/26; H04L 65/1083; H04L 65/604; H04L 65/80; G06F 15/16
USPC .................................. 375/240.02; 348/390.1
See application file for complete search history.

(56) References Cited

U.S. PATENT DOCUMENTS

| | | | |
|---|---|---|---|
| 6,415,326 B1 * | 7/2002 | Gupta ............... | H04N 7/17336 348/E7.073 |
| 6,859,839 B1 * | 2/2005 | Zahorjan ............... | H04N 7/173 709/231 |
| 7,237,254 B1 * | 6/2007 | Omoigui ............ | H04N 7/17318 348/E7.071 |
| 7,739,715 B2 | 6/2010 | He | |
| 7,817,563 B1 * | 10/2010 | Buragohain ........ | G06F 11/3419 370/241 |
| 7,840,693 B2 | 11/2010 | Gupta | |
| 8,081,863 B2 | 12/2011 | Nomura | |
| 8,176,194 B2 | 5/2012 | Saito | |
| 8,218,952 B2 | 7/2012 | Nakano | |

(Continued)

*Primary Examiner* — Marnie A Matt
(74) *Attorney, Agent, or Firm* — Ballard Spahr LLP (57) ABSTRACT

Methods and system for presenting content are disclosed. One method can comprise determining a parameter relating to a receipt of data and determining a safe point, related to transmission of data, based upon the parameter. The method can also comprise presenting content based on the data at a first playback rate until the safe point is reached, and if the safe point is reached, presenting content based on the data at a second playback rate.

19 Claims, 6 Drawing Sheets

(56) References Cited

U.S. PATENT DOCUMENTS

| | | | | |
|---|---|---|---|---|
| 2002/0013949 A1* | 1/2002 | Hejna, Jr. | H04L 29/06 | 725/100 |
| 2003/0212997 A1* | 11/2003 | Hejna, Jr. | H04N 21/47217 | 725/88 |
| 2004/0064576 A1* | 4/2004 | Goldhor | G10L 21/04 | 709/232 |
| 2004/0098748 A1* | 5/2004 | Bo | H04N 7/17336 | 725/105 |
| 2004/0158858 A1* | 8/2004 | Paxton | H04N 7/17336 | 725/42 |
| 2004/0233844 A1* | 11/2004 | Yu | H04L 12/5602 | 370/230 |
| 2004/0267952 A1* | 12/2004 | He | H04L 29/06027 | 709/231 |
| 2005/0193425 A1* | 9/2005 | Sull | G06F 17/30817 | 725/135 |
| 2005/0207733 A1 | 9/2005 | Gargi | | |
| 2006/0095401 A1* | 5/2006 | Krikorian | H04N 21/4398 | 707/1 |
| 2006/0218264 A1* | 9/2006 | Ogawa | H04L 47/10 | 709/223 |
| 2007/0011343 A1* | 1/2007 | Davis | H04L 29/06027 | 709/231 |
| 2008/0022007 A1* | 1/2008 | Hostyn | H04L 29/06027 | 709/231 |
| 2008/0095230 A1* | 4/2008 | Hannuksela | H04N 21/23614 | 375/240.02 |
| 2008/0109556 A1* | 5/2008 | Karlberg | H04N 7/163 | 709/231 |
| 2008/0310496 A1* | 12/2008 | Fang | H04N 7/17336 | 375/240.01 |
| 2009/0290849 A1* | 11/2009 | Ohtake | G11B 19/025 | 386/353 |
| 2010/0235528 A1* | 9/2010 | Bocharov | H04N 21/6437 | 709/231 |
| 2010/0306401 A1* | 12/2010 | Gilson | H04N 5/765 | 709/231 |
| 2011/0087794 A1* | 4/2011 | Li | H04N 5/765 | 709/231 |
| 2011/0138020 A1* | 6/2011 | Pantos | H04N 7/17318 | 709/219 |
| 2011/0164860 A1* | 7/2011 | Nakagawa | H04N 5/772 | 386/343 |
| 2011/0302238 A1 | 12/2011 | Sood | | |
| 2011/0314095 A1* | 12/2011 | Gupta | H04N 21/23412 | 709/203 |
| 2012/0297081 A1* | 11/2012 | Karlsson | H04L 65/4084 | 709/231 |
| 2013/0232534 A1* | 9/2013 | Salkintzis | H04L 47/762 | 725/116 |
| 2014/0115642 A1* | 4/2014 | Krikorian | H04N 21/4398 | 725/94 |
| 2016/0277807 A1* | 9/2016 | Chen | H04N 21/816 | |

* cited by examiner

METHODS AND SYSTEMS FOR INTELLIGENT PLAYBACK

BACKGROUND

Certain computing devices enable users to start watching a portion of content as the content is being downloaded. However, this can lead to frustrating circumstances where the current playback point meets the download point and the user's viewing experience is interrupted. Users may encounter the interruptions over and over until their content is fully downloaded. There are no known satisfactory solutions to this other than delaying playback until the entirety of the content is downloaded, which does not create a preferred customer experience. This disclosure addresses such and other shortcomings related to control and playback during content delivery.

SUMMARY

It is to be understood that both the following summary and the following detailed description are example and explanatory only and are not restrictive, as claimed. Provided are methods and systems for, in one aspect, controlling content on one or more user devices. Provided are methods and systems for, in another aspect, intelligent playback of data such as content.

In an aspect, provided are methods that can comprise determining a parameter relating to a receipt of data. A safe point can be determined based upon the parameter. Content can be presented at a first playback rate until the safe point is reached. If the safe point is reached, content can be presented at a second playback rate.

In another aspect, provided are methods that can comprise determining a parameter relating to a receipt of data. Content can be presented at a playback rate. A safe point can be determined based upon the parameter. The playback rate of the content being presented can be modified until the safe point is reached.

In another aspect, a safe point can be determined based upon the parameter. First content can be presented until the safe point is reached. If the safe point is reached, second content can be presented based on the received data.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

In order to manage and deliver large data files in a streaming environment, streaming technologies that involve an adaptive data stream can divide the data stream into smaller video fragments that are, for example, a few seconds long. The fragments can then be arranged sequentially to form a video in a streaming client. The fragments can vary in video quality and there can be multiple fragments corresponding to a single portion of a stream, each at different levels of quality. In an aspect, adaptive streaming systems, according to the present disclosure, can adapt to network and client changes by loading successive fragments in a higher or lower quality, as needed.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for, in one aspect, controlling content on one or more user devices. Provided are methods and systems for, in another aspect, intelligent playback of data such as content. As an example, a method can comprise determining a parameter such as a transfer rate, consistency of transfer rate, bandwidth, buffer size, buffer capacity, and/or other metrics relating to a receipt of data. As a further example, a safe point can be determined based upon the parameter. The safe point can be a point (e.g., point in time, position in a content asset, playback position, download position, etc.) wherein a user can begin playback of the content at a normal playback rate (e.g., pre-defined playback rate, standard playback rate, default playback rate) and complete his viewing of the video asset without perceived interruption. As an example, the safe point can be calculated based on current transfer speed of the content, available bandwidth, or other network or transfer parameters. As another example, the safe point can be calculated as a point in time where content can be presented at a pre-defined playback rate in a continuous and uninterrupted manner. As a further example, the safe point can be calculated as a threshold amount of received data, wherein content based on the received can be presented at a pre-defined playback rate in a continuous and uninterrupted manner. As such, content can be presented based on the data at a first playback rate until the safe point is reached. If the safe point is reached, content can be presented based on the data at a second playback rate.

Figure 1:
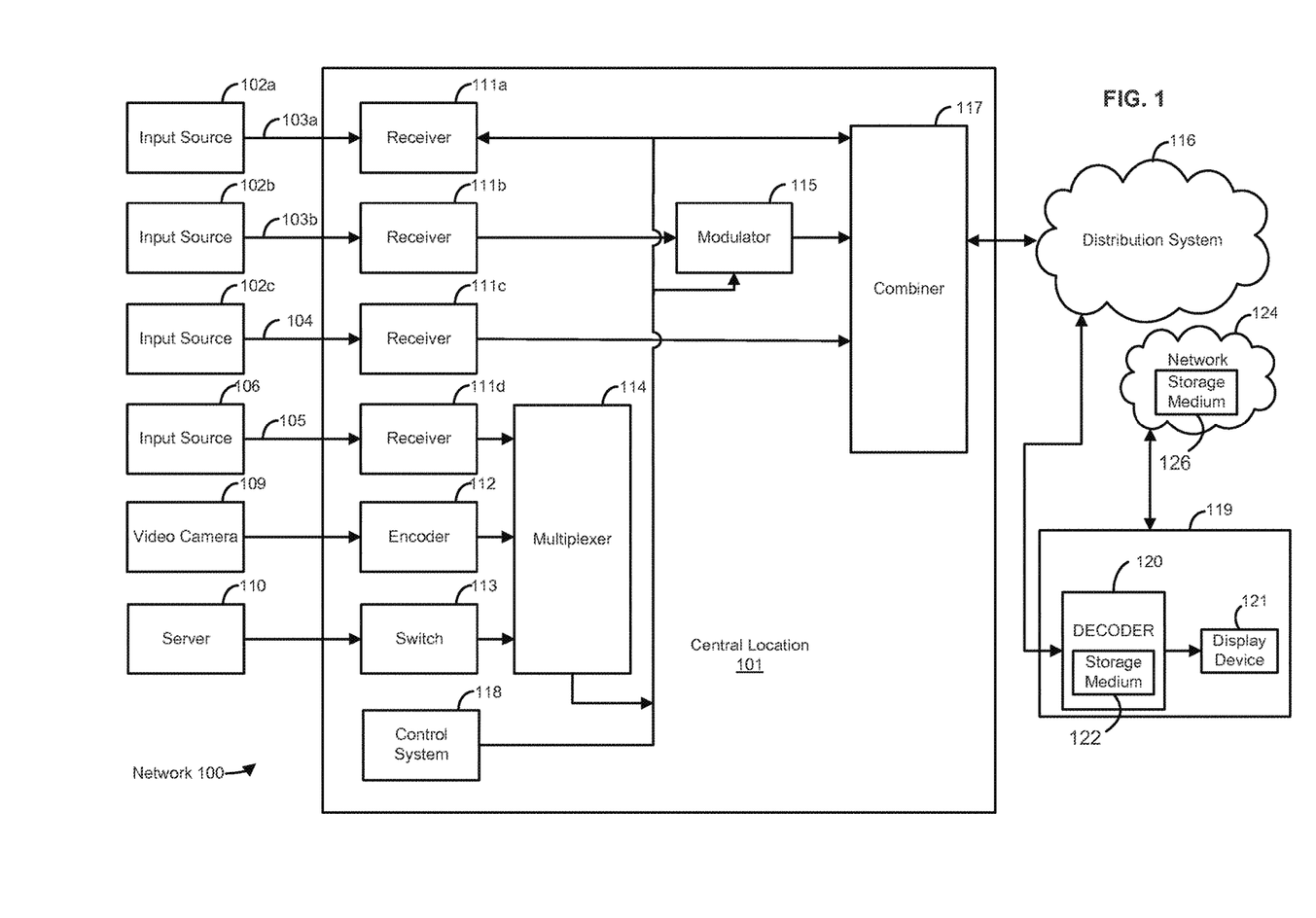
FIG. 1 is a block diagram of an example network.

In an aspect, provided are methods and systems for controlling playback of data such as content. Content can comprise images, video, audio, media, files, data sets, advertisements, commentary, social media feeds, and the like. FIG. 1 illustrates various aspects of an example network environment in which the present methods and systems can operate. Some aspects of the present disclosure relate to methods and systems for content control. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a control or processing facility in a fiber optic network, wireless network or satellite network, a hybrid-fiber coaxial (HFC) content distribution center, a processing center, headend, IP video source, video streaming source, etc.), which can receive content (e.g., data, input programming) from multiple sources. The central location 101 can combine the content from the various sources and can distribute the content to user locations, such as location 119, via distribution system 116. In an aspect, the central location 101 can comprise a computing device for streaming data such as content via a network such as the Internet or other network.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Content can also be created at the central location 101. Other input sources can comprise capture devices such as a video camera 109 or a server 110. The signals provided by the content sources can comprise a single content item or a multiplex that comprises several content items.

The central location 101 can comprise one or a plurality of receivers 111a, 111b, 111c, 111d that are each associated with an input source. For example, MPEG encoders such as encoder 112, are included for encoding/transcoding local content or a video camera 109 feed. As a further example, a data packaging device, such as a fragmentor, can be integrated with the encoder 112 (or separate and in communication with the encoder 112) to package the encoded/transcoded content. In an aspect, the encoder 112 and/or fragmentor can repeatedly embed markers, flags, and signals into the content data stream for processing by downstream devices. A switch 113 can provide access to server 110, which can be, for example, a pay-per-view server, a data server, an internet router, a network system, and/or a phone system. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, and/or conditional access for content distributed to users. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway, user device, mobile device, or communications terminal (CT) can decode, if needed, the signals for display on a display device, such as on a display device 121 such as a television set (TV), a mobile device, or a computer monitor. The display device 121 can be integrated with the decoder 120 or can be stand-alone. Those skilled in the art will appreciate that the signal can be decoded in a variety of equipment, including a CT, a computer, a TV, a monitor, or satellite dish. In an example aspect, the methods and systems disclosed can be located within, or performed on, one or more CT's, user devices, display devices 121, central locations 101, DVR's, home theater PC's, and the like. As an example, the decoder 120 can receive and process embedded markers, flags, and signals in the content data stream for controlling a content received by the decoder 120.

In an aspect, the decoder 120 can comprise a storage medium 122 such as a memory, a buffer, a storage device, or the like. As an example, the storage medium 122 can comprise a memory or a storage device. As a further example, a number of content fragments can be loaded into the storage medium 122 and stored for playback or processing by the associated decoder 120. However, other data, content, and/or information can be stored in the storage medium 122 such as advertisements and alternative content, for example. In an aspect, the storage medium 122 can be separate from the decoder 120. For example, the storage medium 122 can be located upstream of the decoder 120 and downstream of the distribution system 116. As a further example, the storage medium 122 can store information to be transmitted to any number of decoders 120 or other recipient devices. Accordingly, the decoder 120 can retrieve the content fragments from the storage medium 122 for playback without having to communicate with the distribution system 116, thereby reducing latency in playback. In an aspect, the storage medium 120 can process a data stream, which can comprise audio, video, or other data from the distribution system 116 with a regular cadence (e.g., every two seconds, four seconds, ten seconds, and the like). Other data and tracks can be received and processed by the user devices.

In an aspect, the decoder 120, display device 121, or communication terminal can receive one or more information sets from a network 124 such as the Internet, a cellular network, or the like. In another aspect, the network 124 can comprise a storage medium 125 such as a memory, a buffer, a storage device, or the like. As an example, the storage medium 125 can comprise a memory or a storage device. As a further example, a number of information sets such as data sets, content assets, content fragments, and the like can be loaded into the storage medium 125 and stored for subsequent retrieval, playback, and/or processing. However, other data, content, and/or information can be stored in the storage medium 125 such as advertisements and alternative content, for example. In an aspect, the storage medium 122 can be separate from the decoder 120.

In an aspect, user location 119 is not fixed. By way of example, a user can receive content from the distribution system 116 on a mobile device such as a laptop computer, PDA, smartphone, GPS, vehicle entertainment system, and/or portable media player. The network of FIG. 1 is illustrative only and other types of networks and configurations may be used to implement the methods and systems provided.

In an aspect, content such as a video asset can be received by the decoder 120 and/or the display device 121 as transfer data, download data, or streaming data. As the decoder 120 receives a portion of the content, a user may desire to playback the content prior to the entire video asset being received by the decoder 120. In another aspect, a safe point can be calculated, wherein a user can begin playback of the content at a normal playback rate (e.g., pre-defined playback rate, standard playback rate, default playback rate) and complete his viewing of the video asset without perceived interruption. As an example, the safe point can be calculated based on current transfer speed of the content, available bandwidth, or other network or transfer parameters. As another example, the safe point can be calculated as a point in time where content can be presented at a pre-defined playback rate in a continuous and uninterrupted manner. As a further example, the safe point can be calculated as a threshold amount of received data, wherein content based on the received can be presented at a pre-defined playback rate in a continuous and uninterrupted manner.

In an aspect, playback of content being transferred can begin automatically once the safe point has been reached. In another aspect, an on-screen message can be displayed to users to indicate that if they begin playback now, viewing will not be interrupted based on the current transfer speed. In a further aspect, a playback rate can be reduced to a level that is imperceptible by the user until the safe point is reached. Once the safe point is reached, the playback rate can be returned to a normal rate. In another aspect, the safe point can be dynamic. As such, playback rate can be modified based upon analysis of the dynamic safe point, for example via continuous or periodic analysis of the dynamic safe point. As an example, in a one hour content asset, after the content asset begins loading, one minute of video may be captured at a content position of one minute of video in one minute of time. Based on this reception rate, it can be determined that a safe point has been reached, since the receive rate is as fast as the playback rate. However, if the reception rate drops by half (e.g., 30 seconds of video received in one minute of time), the safe point can be recalculated. If the reception rate returns to one minute of video received in one minute of time, the safe point can again be recalculated.

In an aspect, various forms of content can be displayed to users during the initial transfer period before the safe point is reached. As an example, secondary content, such as advertising based content, can be pre-loaded on the device as a part of the application on the mobile device.

Figure 2:
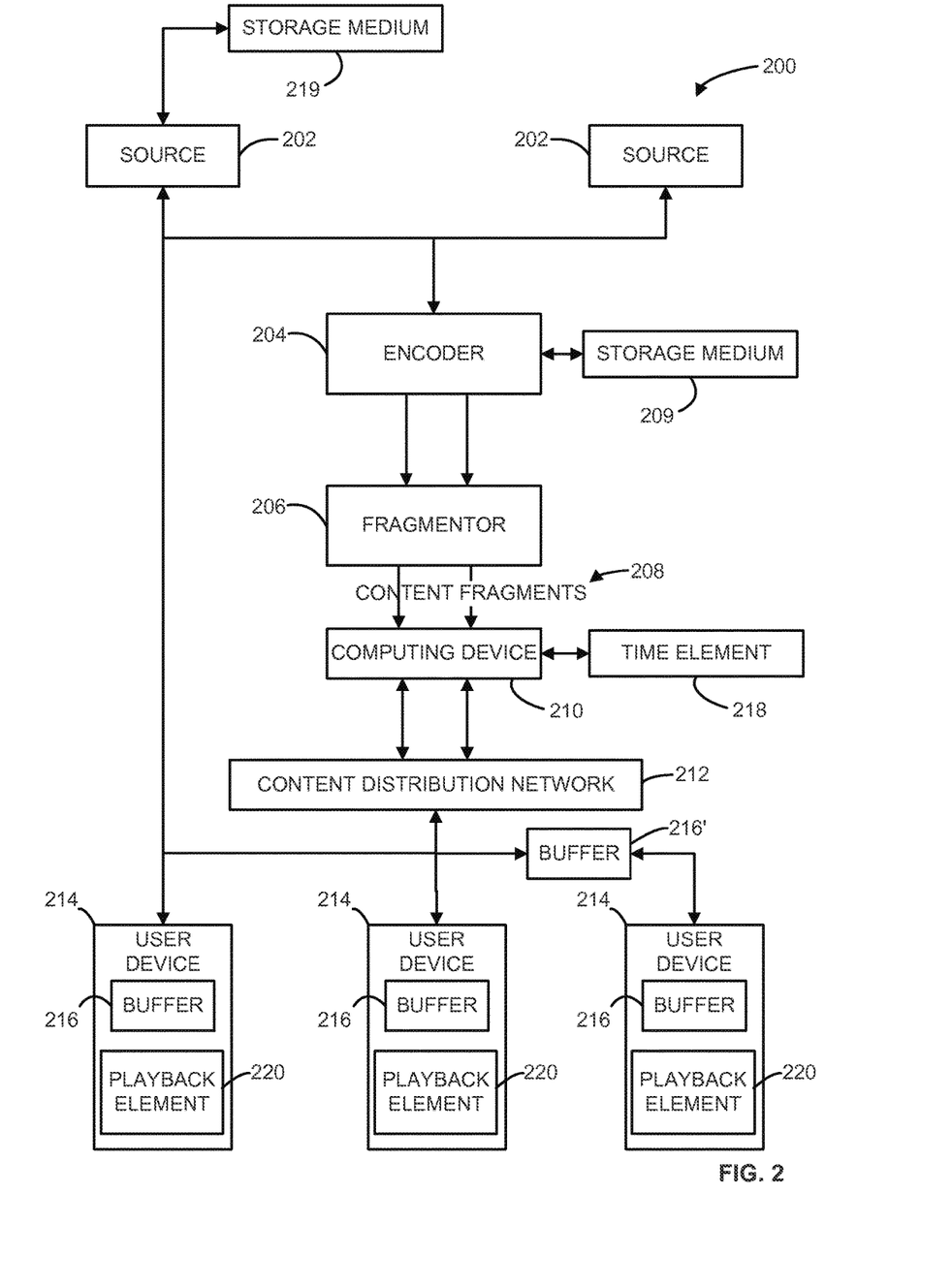
FIG. 2 is a block diagram of an example system architecture.

FIG. 2 is a block diagram of an example system 200. The system 200 can comprise one or more data sources 202 for accessing and/or transmitting data, such as a data stream. An encoder 204 can be in signal communication with the data source 202. A fragmentor 206 can be in signal communication with the encoder 204. As an example, the encoder 204 and the fragmentor 206 can be integrated as part of a unitary device. However, the encoder 204 and the fragmentor 206 can be separate and distinct components.

In an aspect, the data sources 202 can comprise one or more content providers for providing one or more of audio content, video content, data, news feeds, sports programming, advertisements, and the like. As an example, the data sources 202 can be configured to transmit the data (e.g., as a stream, fragments, files, etc.) to various end-users. In an aspect, one or more data sources 202 can comprise a content database having a plurality of advertisements, supplemental content, alternate content, or the like stored therein or capable of accessing content stored elsewhere. As an example, the content database can comprise a plurality of video advertisements. As a further example, the plurality of advertisements, supplemental content, and/or alternate content can each have a particular time duration and/or bitrate associated therewith. In an aspect, the time duration and/or bitrate associated with the advertisements, supplemental content, and/or alternate content can be varied in duration for application in various time dependent circumstances.

As an example, one or more of the data sources 202 can comprise a network data feed transmitting the data stream to users such as subscribers or clients. As a further example, the one or more data sources 202 can be configured to transmit the data stream in a standard video format, such as, but not limited to, any of the Moving Picture Experts Group standards (e.g., MPEG-2, MPEG-4, a single MPEG-4 video encapsulated in an MPEG-2 transport stream over UDP MCAST, etc.), or any other standard for audio and/or video, such as MP3, Quicktime, and Audio Video Interleave (avi). However, the encoder 204 can be configured to receive the data stream from any source having any format that can be encoded (or transcoded) into a format that is appropriate for streaming or otherwise transmitting.

The encoder 204 can be any device, system, apparatus, or the like to encode and/or transcode the data stream. In an aspect, the encoder 204 converts a single (high) bit rate and resolution to an output of multiple (lower) bitrates and resolutions. As an example, the encoder 204 can convert the data stream from the input format received from the data source (such as MPEG-2, QAM, etc.) to a transport format for distribution to consumers (such as MPEG-4). In an aspect, the encoder 204 can be a device such as a transcoder that conditions streaming data and/or changes it from one format to another. The encoder 204 can be configured to receive the data stream, or other type of signal, from one or more of the data sources 202 and encode/transcode information onto the data stream. In an exemplary embodiment, the encoder 204 can be configured to add information to the data stream relating to content fragments 208 or data blocks. In an aspect, a buffer or storage medium 209 can be in communication with the encoder 204 or integrated therewith. As an example, data received by the encoder 204 can be buffered or stored in the storage medium 209.

In an aspect, the fragmentor 206 can be in signal communication with the encoder 204 to receive the data stream therefrom. As an example, the fragmentor 206 and the encoder 204 are configured as a unitary device. However, the fragmentor 206 and the encoder 204 can be integrated or separate. In an aspect, fragmentor 206 conditions the data stream (or other data signal) for downstream distribution by a computing device 210 through a content distribution network 212 to user devices 214 (e.g. the decoder 120). In an aspect, the computing device 210 can be an origin Hypertext Transfer Protocol (HTTP) computing device. However, other computing devices can be used, such as a rate adaptive streaming server. As an example, the fragmentor 206 can communicate with the computing device 210 using the POST method of the HTTP. As a further example, the computing device 210 can implement the functions described relative to the encoder 204 and/or the fragmentor. However, other protocols, configurations, and communication methods can be used.

In an example embodiment, the fragmentor 206 separates or fragments the data stream into each of the content fragments 208 represented by the data stream based upon information encoded in the data stream by the encoder 204. In an additional example embodiment, the fragmentor 206 accesses the information encoded/inserted in the data stream by the encoder 204 to define the content fragments 208 based on, among other things, boundaries, grouping, timing, or duration. Once the content fragments 208 are generated, the content fragments 208 can be transmitted to the content distribution network (CDN) 212 for delivery to the user devices 214 for consumption (e.g., playback). As an example, the computing device 210, CDN 212, and the user devices 214 can intercommunicate using the GET method of HTTP. However, other protocols and communication methods can be used.

In an aspect, one or more of the user devices 214 can comprise a buffer 216. As an example, the buffer 216 can comprise a memory or a storage device. As a further example, a number of the content fragments 208 can be loaded into the buffer 216 and stored for playback by the associated user device 214. Accordingly, the user device 214 can retrieve the content fragments 208 from the buffer 216 for playback without having to communicate with the CDN 212, thereby reducing data stream, which can comprise audio, video, or other data from the computing device 210 with a regular cadence (e.g., every two seconds, four seconds, ten seconds). Other data, content, and/or information can be stored in the buffer 216 such as advertisements and alternative content, for example.

In an aspect, a buffer 216' can be separate from the user device 214. For example, the buffer 216' can be located upstream of the user device 214 and downstream of the CDN 212. As a further example, the buffer 216' can store information to be transmitted to any number of user devices 214 or other recipient devices. Accordingly, the user device 214 can retrieve the content fragments 208 from the buffer 216' for playback without having to communicate with the CDN 212, thereby reducing latency in playback. In an aspect, the content fragments 208 can be retrieved from buffer 216 and 216' simultaneously or in various sequences.

In an aspect, a time element 218 can be in communication with one or more of the encoder 204, the fragmentor 206, and the computing device 210 to provide a timing reference thereto. As an example, the time element 218 can be a clock. As a further example, the time element 218 can transmit information to one or more of the encoder 204, the fragmentor 206, and the computing device 210 for associating a time stamp with a particular event received by one or more of the encoder 204, the fragmentor 206, and the computing device 210. In an aspect, one or more of the encoder 204, the fragmentor 206, and the computing device 210 can cooperate with the time element 218 to associate a time stamp with events having an effect on the content delivered to the user devices 214, such as, for example, content or data request, content or data transfer, a channel tune, a remote tune, remote control events, playpoint audits, playback events, program events including a program start time and/or end time and/or a commercial/intermission time, and/or playlist timing events, and the like. In an aspect, content having a particular time duration can comprise one or more data blocks, wherein each data block represents a portion of the overall time duration of the content. For example, a thirty second commercial can be represented by three ten second data blocks. As a further example, a first data block can represent the first ten seconds of content presentation, a second data block can represent the next sequential ten seconds content presentation, and a third data block can represent the last ten seconds of content presentation. Accordingly, when the three data blocks are processed sequentially, the full thirty seconds of content can be presented.

In an aspect, a playback element 220 can be in communication with one or more of the user devices 214. In an aspect, the playback element 220 can be in communication with one or more data sources 202, an origin server, computing device 210, and/or the content distribution network 212. As an example, the playback element 220 can be configured to control presentation of data, such as content, to one or more of the user devices 214. In an aspect, playback element 220 can log and/or analyze a time at which one or more of the user devices 214 request content. As an example, the playback element 220 can determine (e.g., receive, generate, calculate) a safe point. In another aspect, a safe point can be calculated, wherein a user can begin playback of the content at a normal playback rate (e.g., pre-defined playback rate, standard playback rate, default playback rate) and complete the viewing of the video asset without perceived interruption. As an example, the safe point can be calculated based on current download speed of the content, available bandwidth, or other network or transfer parameters. As another example, the safe point can be calculated as a point in time where content can be presented at a pre-defined playback rate in a continuous and uninterrupted manner. As a further example, the safe point can be calculated as a threshold amount of received data, wherein content based on the received can be presented at a pre-defined playback rate in a continuous and uninterrupted manner. As an example, the safe point can be based upon one or more parameters, such as a transfer rate, a bandwidth, a buffer size, or a buffer capacity, or a combination thereof.

In an aspect, the playback element 220 can calculate a safe point when a user can begin playback at a normal playback rate and complete his viewing of a particular content asset without perceived interruption. As an example, users may be delayed for a period of time before playback can begin, but such delay will insure that the user will have a more pleasant playback experience once the playback begins. Playback of the content being transferred may begin automatically once the 'safe' point has been reached or an on-screen message may be displayed to users to indicate that if the user begins playback now, his viewing will not be interrupted based on the current transfer speed. Various forms of content can be displayed to users during the initial transfer period before the safe point is reached. The playback element 220 can be configured to modify (e.g., reduce) the playback rate of content by a level that is imperceptible to the user. In an aspect, the playback rate can be conditionally and temporarily reduced if it is detected that the current playback speed will allow content playback to overtake the transfer point.

As an example, an overall content asset may have a file size that is 500 mb. The current transfer rate based on the bandwidth available may be 500 kb/sec. If the bitrate remains constant it will take about 1000 seconds or about 16.66 minutes to transfer the entire content asset. Multiple transfer segments may be sampled to initially calculate the safe point, with periodic samples to determine the ongoing transfer speed average. As a further example, playback of transferred content can be about 19 mb/s and the 500 mb content asset would have a playback duration of about 26.31 minutes. Accordingly, an absolute safe point can be calculated by subtracting the difference between the total asset duration (e.g., 26.31 minutes) and the transfer duration (about 16.66 minutes). However, a safe point can be determined as a portion or a fraction of the absolute safe point based upon parameters such as baseline transfer rate, continuous transfer rate, processing rate, bandwidth, and the like.

In an aspect, provided are methods and systems for controlling content transmitted to one or more devices. In an aspect, one or more devices can request one or more data blocks from a content source, origin server, streaming server, rate adaptive server, or the like. Accordingly, the methods and systems can determine and/or estimate a current playback window of content for the one or more devices and can control content delivery based upon the determined playback window.

Figure 3:
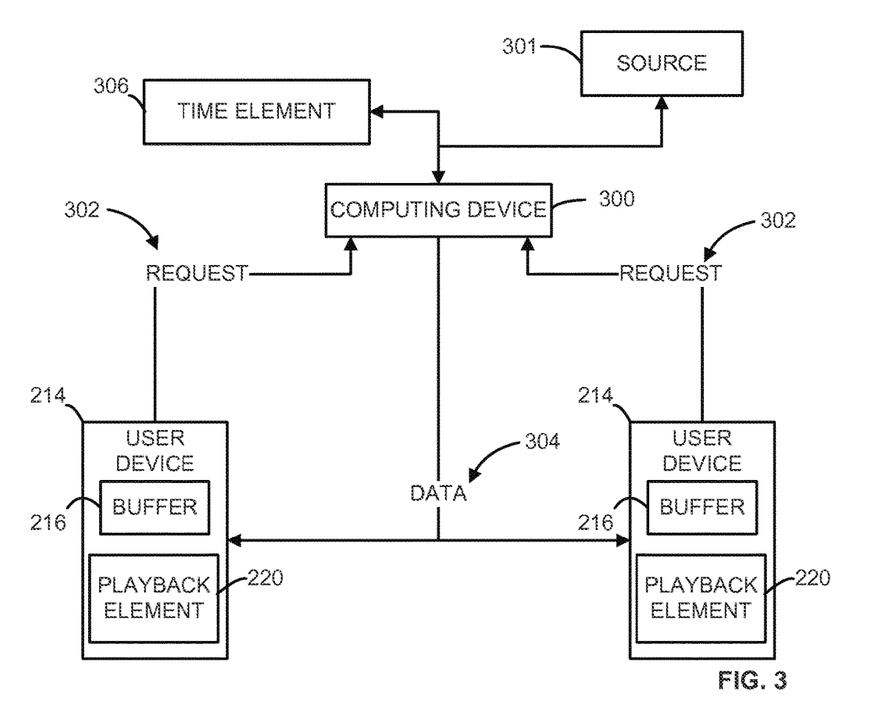
FIG. 3 is a block diagram of an example system architecture.

FIG. 3 is a block diagram of an example system. In an aspect, a computing device 300 (e.g., origin server, transmitting server such as streaming server, etc.) can be in communication with one or more of the user devices 214. In an aspect, the computing device 300 can be in communication with one or more data sources 301 and/or content providers. As an example, the computing device 300 can be configured to control transmission of one or more data blocks to one or more of the user devices 214. In an aspect, the computing device 300 can log and/or analyze one or more content requests 302 received from one or more of the user devices 214 or other devices. As an example, the computing device 300 can be provided with an estimation of the buffer size of one or more user devices 214 (e.g., the device that requests content) and estimate a position of the transmission (e.g., data feed, content asset, playback stream, etc.) currently rendered by one or more of the user devices 214. Buffer size can be estimated by monitoring one or more of a buffer capacity, buffer usage, transfer rate, processing or playback rate, or the like. Buffer size can be monitored by a device (e.g., integrated with the user device 214 or distinct from the user device 214) or software, and/or the user device 214 can provide periodic or continuous feedback relating to buffer size. As an example, a number a requests for data can be tracked and a buffer capacity can be estimated based on the requests and/or a number of the requests. For example, a device buffer having a full capacity of 30 mb may requests two data items that each has a size of 10 mb. As such, it can be estimated that the buffer has capacity for 20 mb of data. As a further example, block lengths (e.g., time duration of data blocks, content blocks, content fragments, and the like) can be one second in duration and a device can request eight data blocks within one second. If it is assumed that the requesting device has not completed playing back a full data block, then the requesting device could not have purged its buffer of any of the received data blocks. As an example, since the device requested eight data blocks it has at least that much room in its buffer for the requested data (e.g., a minimum buffer length of eight seconds assuming one second per data block). Other techniques can be used to estimate buffer size or related parameters.

In an aspect, a time element 306 can be in communication with the computing device 300 to provide a timing reference thereto. As an example, the time element 306 can be a clock. As a further example, the time element 306 can transmit information to the computing device 300 for associating a time stamp with a particular event received by of the computing device 300. In an aspect, the computing device 300 can cooperate with the time element 306 to associate a time stamp with events having an effect on the content delivered to the user devices 214. As an example, events can comprise data or content requests 302, content or data delivery or transfer, a channel tune, a remote tune, remote control events, playpoint audits, playback events, program events including a program start time and/or end time and/or a commercial/intermission time, and/or playlist timing events, and the like.

In an aspect, computing device 300 can determine whether particular data blocks 304 (e.g., content block, special content block, advertisement, blackout screen, alternative programming content, etc.) should be transmitted to one or more of the user devices 214. As an example, the data blocks 304 can be transmitted directly to the user device 214 from the content source 301. However, the data blocks 304 can be routed through one or more networks. As a further example, the data blocks 304 can be retrieved directly from a computing device, such as the computing device 300. In an aspect, data blocks 300 can be spliced into the content fragments received at the user device 214 based upon an instruction from the computing device 300. As an example, the computing device 300 can be a rate adaptive computing device and can encode the requested data blocks 304 into fragments. Each fragment can be encoded based on one or more profile settings for recipient devices, users, and/or content players. Each fragment can comprise an encoding rate and fragment duration. The computing device 300 can be configured to receive feedback from the user device 214 and can adjust the encoding rate to move the safe point closer to the start time of the content stream. For example, the encoding rate can be changed to require less time to buffer the content asset until the safe point is reached or within a predefined threshold. Once the safe point is reached or within a threshold, the original encoding rate can be restored. As a further example, if the user pauses the playback of a content asset, or rewinds, the encoding rate can be adjusted to increase the quality or to maximize the receipt rate of the transferring content asset.

In an aspect, content requests 302 can be received based upon a pre-defined sequence. As an example, one or more user devices 214 can request a next available data block 304 from a sequence of data blocks 304. As a further example, one or more user devices can request data blocks 304 to fill the associated buffer 216. As another example, the buffer 216 can be filled based on the client configuration of the requesting user device 214. In an aspect, one or more user devices 214 can continue to request the next data block in a particular content stream at predictable times based upon a consumption rate of content by the one or more user devices 214. In an aspect, the computing device 300 can use information relating to the received content requests 302 to determine a playback window (e.g., position or range of positions in the content stream currently being rendered) for the associated user device 214. As an example, the computing device 300 can use time of block request, time of block download, presentation time duration, presentation time range, and/or estimated buffer length to determine a playback window. In an aspect, playback window estimation can be used to provide boundaries (e g, min or max) for playback position estimates.

Figure 4A:
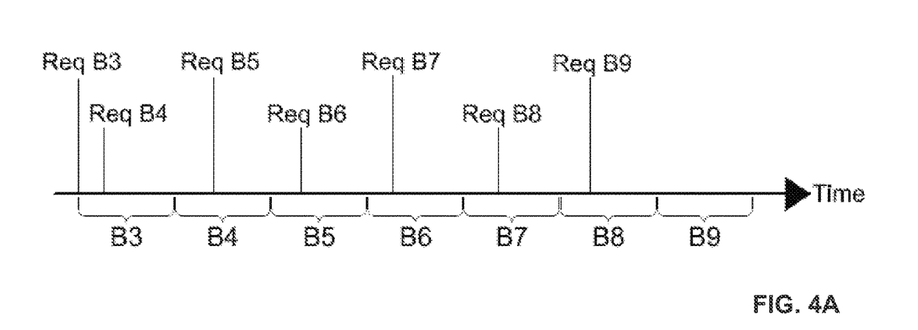
FIG. 4A is a representation of an example content delivery timeline.

FIG. 4A illustrates an example timeline representing content requests ReqB3, ReqB4, ReqB5, ReqB6, ReqB7, ReqB8, ReqB9 and playback windows B3, B4, B5, B6, B7, B8, B9 for the requested content. As shown early in the timeline, content requests ReqB3 and ReqB4 are in relatively close proximity to each other since requesting users and/or devices may have an empty buffer at the start of downloading or streaming and can request a plurality of data and/or content to load in the respective buffer. In an aspect, as the subsequent content requests are received, a computing device such as computing device 300 (FIG. 3) can track and/or log one or more parameters relating to the transmission of the content. As an example, the one or more parameters can comprise request rate, bandwidth, transfer rate, a buffer size, or a buffer capacity, or a combination thereof.

Figure 4B:
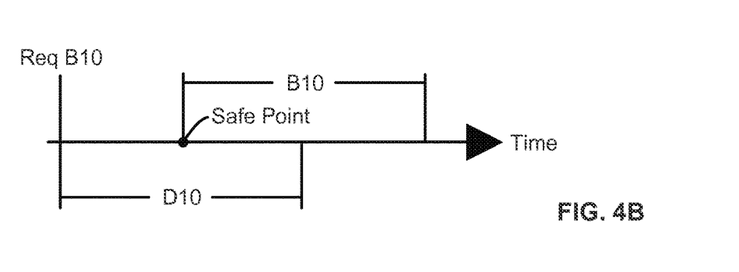
FIG. 4B is a representation of an example content delivery timeline.

FIG. 4B illustrates an example timeline representing a content request ReqB10 and transfer windows for the requested content, such as transfer (e.g., transmission, download, etc.) window D10 and playback window B10 for the requested content. In an aspect, once the request ReqB10 is received, transfer (e.g., streaming or download) of the content requested can be initiated. Based upon, for example, network and processing conditions, an estimated transfer window D10 can be determined. As another example, the transfer window D10 can be recalculated dynamically, continuously and/or periodically. As a further example, the content that has been received by a requesting device can be presented via the requesting device. In an aspect, a safe point can be determined using the transfer windows. As an example, an overall content asset may have a file size that is 3.2 Gb. The current transmission rate based on the bandwidth available may be 500 kb/sec. If the transmission bitrate remains constant it will take about 6400 seconds or about 106.66 minutes to transfer the entire content asset. As a further example, playback of transferred content can be about 19 mb/s and the 3.2 Gb content asset would have a playback duration of about 168.42 minutes. Accordingly, a safe point can be calculated by subtracting the difference between the total asset duration (e.g., 168.42 minutes) and the transfer duration (about 106.66 minutes). An implemented safe point can be determined as a portion or a fraction of the calculated safe point based upon parameters such as baseline transfer rate, continuous transfer rate, processing rate, bandwidth, and the like. The safe point can be recalculated periodically or continuously to adjust for changing transfer conditions.

Figure 5:
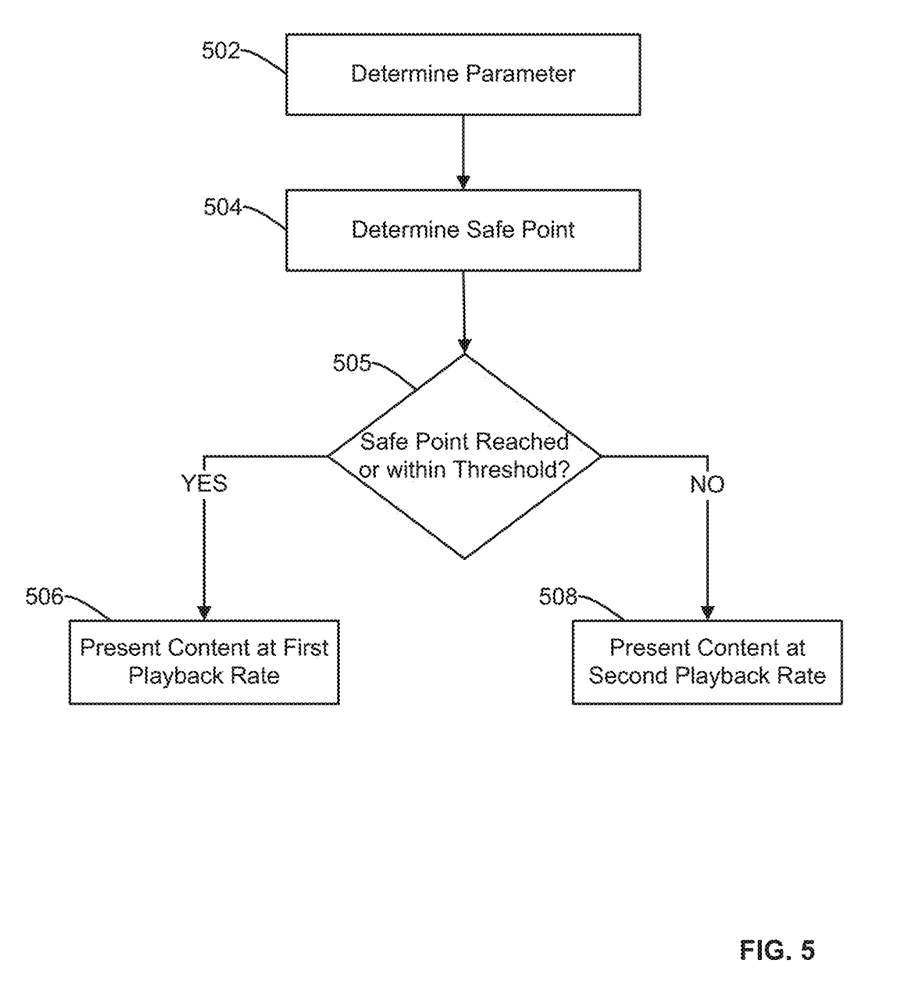
FIG. 5 is a flow chart of an example method.

FIG. 5 illustrates an example method. In step 502, a parameter can be determined (e.g., calculated, retrieved, generated, etc.). In an aspect, the parameter can relate to a receipt of data. As an example, the parameter comprises a transfer rate, baseline transfer rate, continuous transfer rate, a bandwidth, a buffer size, or a buffer capacity, or a combination thereof. As a further example, the data received can comprise one or more content fragments, data assets, and/or the like. In an aspect, the data received can comprise information such as a bit rate, a resolution, or a combination thereof.

In step 504, a safe point can be determined. In one aspect, a safe point can be calculated, wherein a user can begin playback of the content at a normal playback rate (e.g., pre-defined playback rate, standard playback rate, default playback rate) and complete his viewing of the video asset without perceived interruption. As an example, the safe point can be calculated based on current transfer speed of the content, available bandwidth, or other network or transfer parameters. As another example, the safe point can be calculated as a point in time where content can be presented at a pre-defined playback rate in a continuous and uninterrupted manner. As a further example, the safe point can be calculated as a threshold amount of received data, wherein content based on the received can be presented at a pre-defined playback rate in a continuous and uninterrupted manner. As an example, the safe point can be based upon the parameter determined in step 502. In an aspect, an overall content asset may have a file size that is 6.0 Gb. The current transmission rate based on the bandwidth available may be 500 kb/sec. If the transmission bitrate remains constant it will take about 12000 seconds or about 200 minutes to transfer the entire content asset. As a further example, playback of transferred content can be about 20 mb/s and the 6.0 Gb content asset would have a playback duration of about 300 minutes. Accordingly, a safe point can be calculated by subtracting the difference between the total asset playback duration (e.g., 300 minutes) and the transfer duration (about 200 minutes) to result in a safe point of 100 minutes. As an example, the safe point can be implemented as a point in time when a device has received enough data to provide 100 minutes of playback of the content asset, or in this case, about one-third of the total data asset. An implemented safe point can be determined as a portion or a fraction of the calculated safe point based upon parameters such as baseline transfer rate, continuous transfer rate, processing rate, bandwidth, and the like. The safe point can be recalculated periodically or continuously to adjust for changing transfer conditions.

In step 505, it can be determined whether the safe point has been reached or is within a predefined threshold. In an aspect, reaching the safe point can comprise, for example, playback of content within a threshold proximity of the determined safe point. As another example, point in time and/or a point in a content asset can be compared to the determined safe point and/or a threshold proximity of the safe point to determine if the safe point has been reached.

In step 506, content can be presented. In an aspect, the content can be presented at a first playback rate until the safe point or a threshold proximity to the safe point is reached. As an example, the first playback rate can be based upon the parameter determined in step 502. In step 508, content can be presented at a second playback rate. In an aspect, if the safe point is reached, content based on the data can be presented at a second playback rate. In another aspect, the content can be presented in a substantially continuous manner regardless of the playback rate. As an example, the first playback rate can be a normal playback rate. As another example, the second playback rate can be a modified playback rate. As a further example, the second playback rate can be a reduced playback rate.

Figure 6:
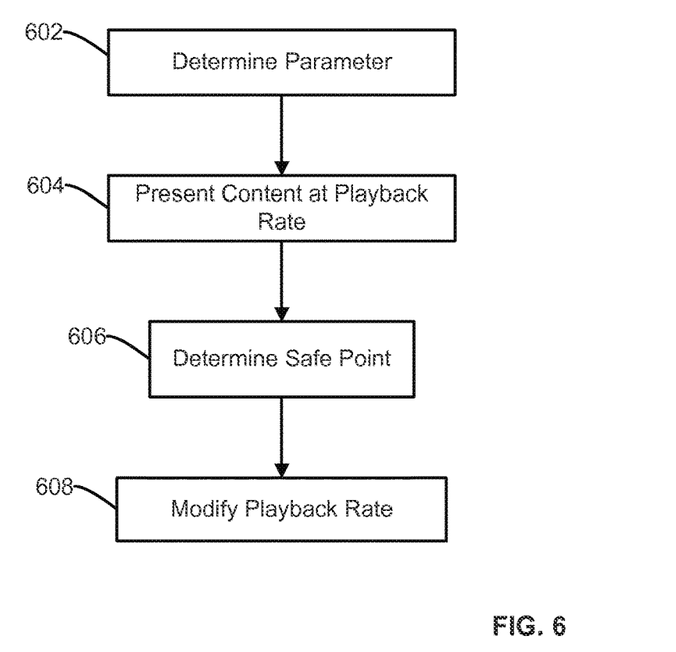
FIG. 6 is a flow chart of an example method.

FIG. 6 illustrates an example method. In step 602, a parameter can be determined (e.g., calculated, retrieved, generated, etc.). In an aspect, the parameter can relate to a receipt of data. As an example, the parameter can comprise a transfer rate, a bandwidth, a buffer size, a buffer capacity, or a combination thereof. As a further example, the data received can comprise one or more content fragments, data assets, and/or the like. In an aspect, the data received can comprise information such as a bit rate, a resolution, or a combination thereof.

In step 604, content can be presented at a playback rate. In an aspect, the playback rate can be a standard or pre-defined playback rate. As an example, content can be presented in response to a request such as a transfer request or a request for a data fragment.

In step 606, a safe point can be determined. In another aspect, a safe point can be calculated, wherein a user can begin playback of the content at a normal playback rate (e.g., pre-defined playback rate, standard playback rate, default playback rate) and complete his viewing of the video asset without perceived interruption. As an example, the safe point can be calculated based on current transfer speed of the content, available bandwidth, or other network or transfer parameters. As another example, the safe point can be calculated as a point in time where content can be presented at a pre-defined playback rate in a continuous and uninterrupted manner. As a further example, the safe point can be calculated as a threshold amount of received data, wherein content based on the received can be presented at a pre-defined playback rate in a continuous and uninterrupted manner. As an example, the safe point can be based upon the parameter determined in step 602. In an aspect, an overall content asset may have a file size that is 3.2 Gb. The current transmission rate based on the bandwidth available may be 500 kb/sec. If the transmission bitrate remains constant it will take about 6400 seconds or about 106.66 minutes to transfer the entire content asset. As a further example, playback of transferred content can be about 19 mb/s and the 3.2 Gb content asset would have a playback duration of about 168.42 minutes. Accordingly, a safe point can be calculated by subtracting the difference between the total asset duration (e.g., 168.42 minutes) and the transfer duration (about 106.66 minutes) resulting in a safe point of about 61.76 minutes. As an example, a safe point can be implemented at a point of about 61.76 minutes of playback. As a further example, if transfer conditions remain near constant and the safe point is reached, there should be no interruption in playback of the content asset since the remaining duration of playback is greater than or equal to the remaining time required to complete transfer of the full data asset. An implemented safe point can be determined as a portion or a fraction of the calculated safe point based upon parameters such as baseline transfer rate, continuous transfer rate, processing rate, bandwidth, and the like. The safe point can be recalculated periodically or continuously to adjust for changing transfer conditions.

In step 608, the playback rate of the content being presented can be modified until the safe point is reached. In an aspect, modifying the playback rate can comprise reducing the playback rate. As an example, the playback rate can be modified so as to reduce the playback rate in a manner that is imperceptible to a viewer of the presented content. As a further example, the playback rate can be continuously modified between a normal rate and a modified rate based upon the parameter determined in step 602.

Figure 7:
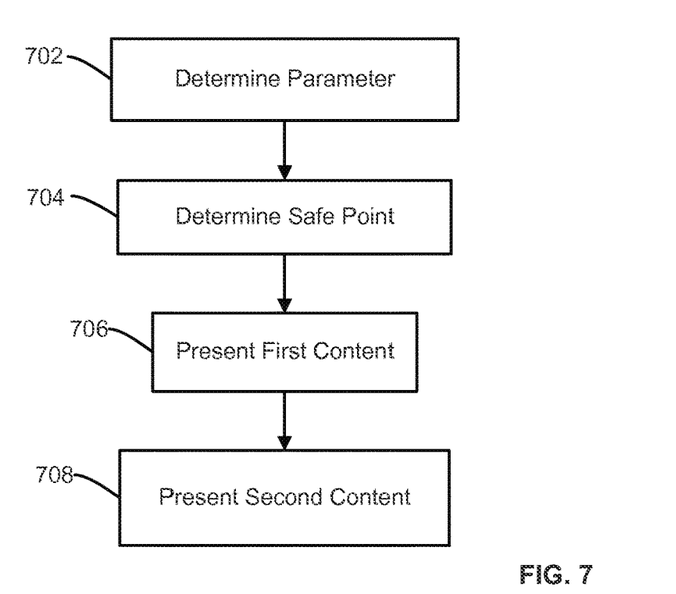
FIG. 7 is a flow chart of an example method.

FIG. 7 illustrates an example method for controlling (e.g., transmitting, presenting, etc.) content. In step 702, a parameter can be determined (e.g., calculated, retrieved, generated, etc.). In an aspect, the parameter can relate to a receipt of data. As an example, the parameter can comprise a transfer rate, a bandwidth, a buffer size, or a buffer capacity, or a combination thereof. As a further example, the data received can comprise one or more content fragments, data assets, and/or the like. In an aspect, the data received can comprise information, such as a bit rate, a resolution, or a combination thereof.

In step 704, a safe point can be determined. In another aspect, a safe point can be calculated, wherein a user can begin playback of the content at a normal playback rate (e.g., pre-defined playback rate, standard playback rate, default playback rate) and complete his viewing of the video asset without perceived interruption. As an example, the safe point can be calculated based on current transfer speed of the content, available bandwidth, or other network or transfer parameters. As another example, the safe point can be calculated as a point in time where content can be presented at a pre-defined playback rate in a continuous and uninterrupted manner. As a further example, the safe point can be calculated as a threshold amount of received data, wherein content based on the received can be presented at a pre-defined playback rate in a continuous and uninterrupted manner. As an example, the safe point can be based upon the parameter determined in step 702. In an aspect, an overall content asset may have a file size that is 3.2 Gb. The current transmission rate based on the bandwidth available may be 500 kb/sec. If the transmission bitrate remains constant it will take about 6400 seconds or about 106.66 minutes to transfer the entire content asset. As a further example, playback of transferred content can be about 19 mb/s and the 3.2 Gb content asset would have a playback duration of about 168.42 minutes. Accordingly, a safe point can be calculated by subtracting the difference between the total asset duration (e.g., 168.42 minutes) and the transfer duration (about 106.66 minutes). An implemented safe point can be determined as a portion or a fraction of the calculated safe point based upon parameters such as baseline transfer rate, continuous transfer rate, processing rate, bandwidth, and the like. The safe point can be recalculated periodically or continuously to adjust for changing transfer conditions.

In step 706, first content can be provided (e.g., transmitted, presented, etc.) until the safe point is reached. In an aspect, the first content can comprise advertisement, pre-loaded content, alternate content, or supplemental content, or a combination thereof. As an example, the supplemental content can be interstitial material relating to the content the user is currently transferring and/or previous content that the user has transferred or streamed. As another example, the first content can be targeted advertising based on known demographics of the user that are of value to advertisers, such as location (e.g., zip code), income level, education, presence of teenagers in the home, etc. As a further example, the first content can comprise a countdown timer that indicates how long a user may be watching the secondary content until the transferred content asset is ready for playback.

In step 708, second content can be presented. In an aspect, the second content can be conditionally presented once the safe point is reached. As an example, the first content and the second content can be presented in a substantially continuous manner. As a further example, the second content can comprise content transferred by the user. The second content can be a content asset requested by a user. The second content can comprise advertisements, video, audio, images, supplemental content, commentary, social media feeds, and the like.

Figure 8:
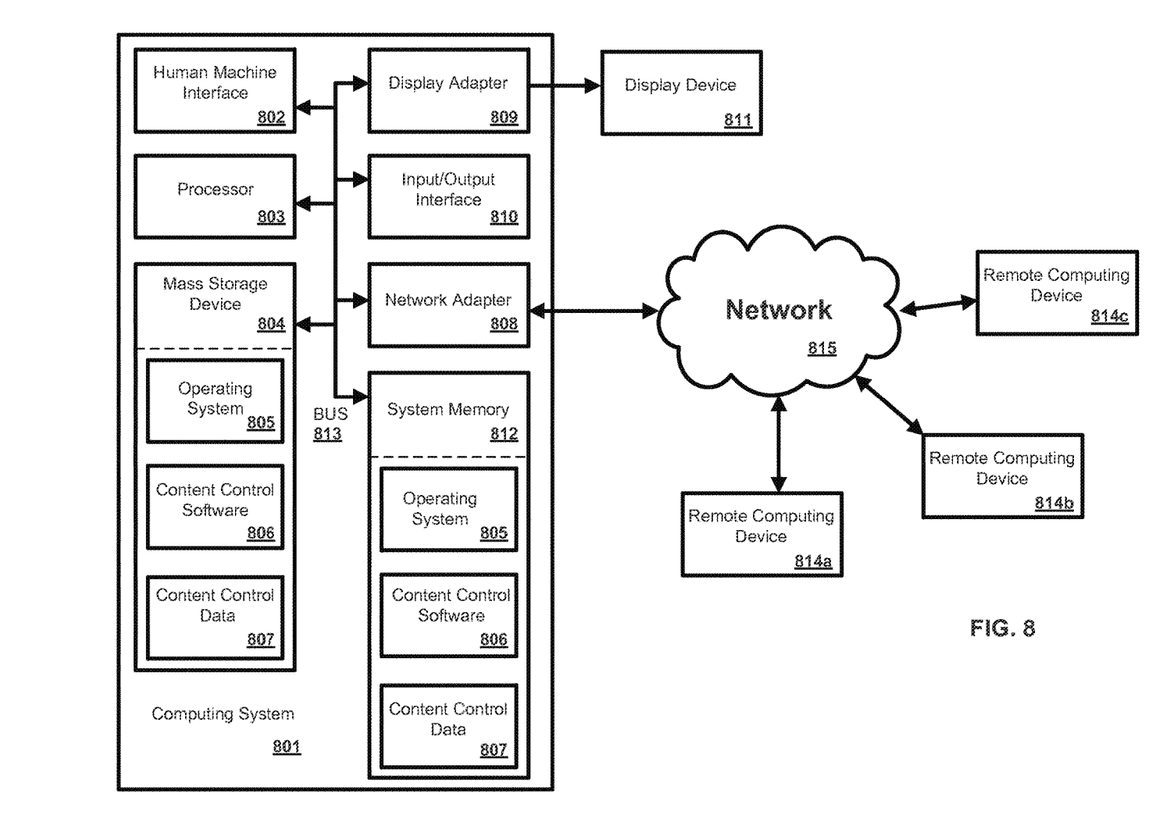
FIG. 8 is a block diagram of an example computing system.

In an example aspect, the methods and systems can be implemented on a computing system 801 as illustrated in FIG. 8 and described below. By way of example, computing device 210, the user device 214, and/or the playback element 220 of FIG. 2 can be a computing system as illustrated in FIG. 8.

FIG. 8 is a block diagram illustrating an example operating environment for performing the disclosed methods. One skilled in the art will appreciate that provided herein is a functional description and that the respective functions can be performed by software, hardware, or a combination of software and hardware. This example operating environment is only an example of an operating environment and is not intended to suggest any limitation as to the scope of use or functionality of operating environment architecture. Neither should the operating environment be interpreted as having any dependency or requirement relating to any one or combination of components illustrated in the example operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, and/or distributed computing environments that comprise any of the above systems or devices.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing system 801. The components of the computing system 801 can comprise, but are not limited to, one or more processors or processing units 803, a system memory 812, and a system bus 813 that couples various system components including the processor 803 to the system memory 812. In the case of multiple processing units 803, the system can utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the processor 803, a mass storage device 804, an operating system 805, content control software 806, content control data 807, a network adapter 808, system memory 812, an Input/Output Interface 810, a display adapter 809, a display device 811, and a human machine interface 802, can be contained within one or more remote computing devices 814a,b,c at physically separate locations, connected through buses of this form, in effect implementing a fully distributed system.

The computing system 801 typically comprises a variety of computer readable media. Example readable media can be any available media that is accessible by the computing system 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as content control data 807 and/or program modules such as operating system 805 and content control software 806 that are immediately accessible to and/or are presently operated on by the processing unit 803.

In another aspect, the computing system 801 can also comprise other removable/non-removable, volatile/non-volatile computer storage media. By way of example, FIG. 8 illustrates a mass storage device 804 which can provide non-volatile storage of computer code, computer readable instructions, data structures, program modules, and other data for the computing system 801. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, an operating system 805 and content control software 806. Each of the operating system 805 and content control software 806 (or some combination thereof) can comprise elements of the programming and the content control software 806. Content control data 807 can also be stored on the mass storage device 804. Content control data 807 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In an aspect, content control data 807 can comprise information relating to events, event notifiers, placement spots, alternate programming, programming blackout, advertisements, and the like. As an example, the content control data can comprise information relating to a particular programming being transmitted to a user location. As a further example, the content control data can comprise information and instructions related to processing placement signals and updating content being transmitted to a user location. However, other information can be associated with the content control data, such as information about the subscriber consuming the content including location, device type, and subscription information, and information relating the content for blackouts including blackout locations and alternative content associated with the blackout.

In another aspect, the user can enter commands and information into the computing system 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, a display device 811 can also be connected to the system bus 813 via an interface, such as a display adapter 809. It is contemplated that the computing system 801 can have more than one display adapter 809 and the computing system 801 can have more than one display device 811. For example, a display device can be a monitor, an LCD (Liquid Crystal Display), or a projector. In addition to the display device 811, other output peripheral devices can comprise components such as speakers (not shown) and a printer (not shown) which can be connected to the computing system 801 via Input/Output Interface 810. Any step and/or result of the methods can be output in any form to an output device. Such output can be any form of visual representation, including, but not limited to, textual, graphical, animation, audio, tactile, and the like. The display 811 and computing system 801 can be part of one device, or separate devices.

The computing system 801 can operate in a networked environment using logical connections to one or more remote computing devices 814a,b,c. By way of example, a remote computing device can be a personal computer, portable computer, smartphone, a server, a router, a network computer, a peer device or other common network node, and so on. Logical connections between the computing system 801 and a remote computing device 814a,b,c can be made via a network 815, such as a local area network (LAN) and/or a general wide area network (WAN). Such network connections can be through a network adapter 808. A network adapter 808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are illustrated herein as discrete blocks, although it is recognized that such programs and components reside at various times in different storage components of the computing system 801, and are executed by the data processor(s) of the computer. An implementation of content control software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and communications media. "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving, by a computing device, media content for playback;
   determining, by the computing device based on an arrival rate of the received media content, a parameter relating to the received media content;
   determining, by the computing device based upon the parameter, a safe point, wherein the safe point comprises a point in time when a remainder of the received media content can be presented at a constant pre-defined playback speed;
   causing, by the computing device, output of the received media content at a first playback speed until the safe point is reached; and
   when the safe point is reached, causing, by the computing device, output of the received media content at a second playback speed.

2. The method of claim 1, wherein the received media content comprises content fragments.

3. The method of claim 1, wherein the parameter comprises a transfer rate of the received media content.

4. The method of claim 1, wherein the second playback speed is a normal playback speed.

5. The method of claim 1, wherein the first playback speed is a modified playback speed.

6. The method of claim 1, wherein the first playback speed is a reduced playback speed.

7. The method of claim 1, wherein the second playback speed is the pre-defined playback speed.

8. A method, comprising:
   receiving, by a computing device, media content for playback;
   determining, by the computing device based on an arrival rate of the received media content, a parameter relating to the received media content;
   causing, by the computing device, output of the received media content at a playback speed;
   determining, by the computing device based upon the parameter, a safe point, wherein the safe point comprises a point in time when a remainder of the received media content can be presented at a constant pre-defined playback speed; and
   modifying, by the computing device, the playback speed of the received media content being presented until the safe point is reached.

9. The method of claim 8, wherein the received media content comprises content fragments.

10. The method of claim 8, wherein the received media content comprises a resolution.

11. The method of claim 8, wherein the parameter comprises a bandwidth.

12. The method of claim 8, wherein the safe point comprises a time marker.

13. The method of claim 8, wherein modifying the playback speed comprises reducing the playback speed.

14. The method of claim 8, further comprising causing output of the received media content at the pre-defined playback speed once the safe point is reached.

15. A method, comprising:
    determining, by a computing device, a parameter relating to a receipt of data;
    determining, by the computing device based upon the parameter, a safe point, wherein the safe point comprises a point in time when a remainder of content can be presented at a constant pre-defined playback speed;
    causing, by the computing device based on the data, output of first content at a first playback speed until the safe point is reached; and
    when the safe point is reached, causing, by the computing device based on the data, output of second content at a second playback speed.

16. The method of claim 15, wherein the received data comprises content fragments.

17. The method of claim 15, wherein the parameter comprises a consistency of transfer rate.

18. The method of claim 15, wherein the first content comprises an advertisement.

19. The method of claim 15, wherein the second playback speed is the same as the constant pre-defined playback speed.

* * * * *